(12) United States Patent
Raghavan et al.

(10) Patent No.: US 12,041,464 B2
(45) Date of Patent: Jul. 16, 2024

(54) UPLINK SPATIAL RELATION SWITCH DELAY

(71) Applicant: Apple Inc., Cupertino, CA (US)

(72) Inventors: Manasa Raghavan, Sunnyvale, CA (US); Qiming Li, Beijing (CN); Dawei Zhang, Saratoga, CA (US); Huaning Niu, San Jose, CA (US); Jie Cui, San Jose, CA (US); Panagiotis Botsinis, Munich (DE); Sameh M. Eldessoki, Munich (DE); Xiang Chen, Campbell, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 474 days.

(21) Appl. No.: 17/440,132

(22) PCT Filed: Jan. 13, 2021

(86) PCT No.: PCT/CN2021/071476
§ 371 (c)(1),
(2) Date: Sep. 16, 2021

(87) PCT Pub. No.: WO2022/151041
PCT Pub. Date: Jul. 21, 2022

(65) Prior Publication Data
US 2023/0089752 A1    Mar. 23, 2023

(51) Int. Cl.
*H04W 16/28* (2009.01)
*H04L 5/00* (2006.01)
*H04W 24/10* (2009.01)

(52) U.S. Cl.
CPC ........... *H04W 16/28* (2013.01); *H04L 5/0051* (2013.01); *H04W 24/10* (2013.01)

(58) Field of Classification Search
CPC .... H04W 16/28; H04W 24/10; H04L 5/0051; H04B 7/0695
See application file for complete search history.

(56) References Cited

U.S. PATENT DOCUMENTS

| | | | |
|---|---|---|---|
| 7,184,138 B1 * | 2/2007 | Li | G01N 21/8806 356/600 |
| 2016/0301539 A1 * | 10/2016 | Lindoff | H04W 40/12 |
| 2017/0363725 A1 * | 12/2017 | Ignjatovic | G01S 15/8959 |
| 2020/0053721 A1 | 2/2020 | Cheng et al. | |

(Continued)

FOREIGN PATENT DOCUMENTS

| | | |
|---|---|---|
| CN | 110535605 | 12/2019 |
| CN | 110859008 | 3/2020 |

OTHER PUBLICATIONS

CR on Active Spatial Relation Switching Delay (Section 8.12), R4-2006479, 3GPP TSG-RAN WG4 Meeting #95-e, May 25-Jun. 5, 2020, 3 pages.

(Continued)

*Primary Examiner* — Christine Ng
(74) *Attorney, Agent, or Firm* — Kilpatrick Townsend & Stockton LLP

(57) ABSTRACT

The present application relates to devices and components including apparatus, systems, and methods to provide uplink spatial relation switch delay for an uplink spatial relation switch based at least in part on a pathloss reference signal associated with uplink spatial relation switch.

20 Claims, 11 Drawing Sheets

(56) References Cited

U.S. PATENT DOCUMENTS

2020/0351801 A1* 11/2020 Jeon ................. H04W 52/48
2021/0083822 A1* 3/2021 Jia ................... H04W 52/367
2022/0210844 A1* 6/2022 MolavianJazi ... H04W 74/0866

OTHER PUBLICATIONS

On Spatial Relation Switching Delay Requirements, R4-2010666, 3GPP TSG RAN WG4 Meeting #96-e, Aug. 17-28, 2020, 4 pages.
International Patent Application No. PCT/CN2021/071476, International Search Report and Written Opinion, dated Sep. 28, 2021, 9 pages.
Correction on RRC based spatial relation switch delay, Huawei, HiSilicon, 3GPP TSG RAN Meeting #97e, R4-2015499, Nov. 2-13, 2020, 3 pages.
3rd Generation Partnership Project; Technical Specification Group Radio Access Network; NR; Physical layer procedures for control (Release 16), 3GPP TS 38.213 V16.4.0, Dec. 2020, 181 pages.
3rd Generation Partnership Project; Technical Specification Group Radio Access Network; NR; Requirements for support of radio resource management (Release 17), 3GPP TS 38.133 V17.0.0, Dec. 2020, 2400 pages.
The International Application No. PCT/CN2021/071476, "International Preliminary Report on Patentability," dated Jul. 27, 2023, 6 pages.

* cited by examiner

200

| PHY channel | Triggering method |
|---|---|
| PUCCH | RRC |
| PUCCH | MAC-CE |
| P-SRS | RRC |
| SP-SRS | MAC-CE |
| A-SRS | DCI |

```
-- ASN1START
-- TAG-PUCCH-SPATIALRELATIONINFO-START

PUCCH-SpatialRelationInfo ::=      SEQUENCE {
    pucch-SpatialRelationInfoId    PUCCH-SpatialRelationInfoId,
    servingCellId                  ServCellIndex
    referenceSignal                CHOICE {
        ssb-Index                      SSB-Index,
        csi-RS-Index                   NZP-CSI-RS-ResourceId,
        srs                            PUCCH-SRS
    },
    pucch-PathlossReferenceRS-Id   PUCCH-PathlossReferenceRS-Id,
    p0-PUCCH-Id                    P0-PUCCH-Id,
    closedLoopIndex                ENUMERATED { i0, i1 }
}
```

| Additional delay | PL-RS previously measured/ activated | PL-RS not measured/ activated |
| --- | --- | --- |
| Known UL spatial relation | NA | Time for target PL-RS measurement |
| Unknown UL spatial relation | Time for RX beam refinement for target UL spatial relation | Time for RX beam refinement and Time for target PL-RS measurement |

Figure 4

| Additional Delay | | PL-RS previously measured/ activated | PL-RS not measured/ activated |
| --- | --- | --- | --- |
| Known UL spatial relation | Known PL-RS | NA | Time of target PL-RS measurement |
| Known UL spatial relation | Unknown PL-RS | Time for RX beam refinement for target PL-RS | Time for RX beam refinement for target PL-RS and target PL-RS measurement |
| Unknown UL spatial relation | Known PL-RS | Time for RX beam refinement for target UL spatial relation | Time for RX beam refinement for target UL spatial relation and time for target PL-RS measurement |
| Unknown UL spatial relation | Unknown PL-RS | Time for RX beam refinement for target UL spatial relation and PL-RS | Time for RX beam refinement for target UL spatial relation and PL-RS and time for target PL-RS measurement |

Figure 5

UPLINK SPATIAL RELATION SWITCH DELAY

CROSS-REFERENCES TO RELATED APPLICATIONS

This application is a U.S. National Stage Application of PCT/CN2021/071476, filed Jan. 13, 2021. The disclosure of which is herein incorporated by reference in its entirety for all purposes.

BACKGROUND

Third Generation Partnership Project (3GPP) networks provide that an uplink spatial relation switch may be performed with a user equipment (UE). The uplink spatial relation switch may cause the UE to change spatial filters for transmission of an uplink signal based on the uplink spatial relation switch.

BRIEF DESCRIPTION OF THE DRAWINGS

FIG. 2 illustrates a table of example triggering methods in accordance with some embodiments.

FIG. 3 illustrates an example uplink spatial relation information element in accordance with some embodiments.

FIG. 4 illustrates a table of example additional delay amounts for uplink spatial relation switch delay in accordance with some embodiments.

FIG. 5 illustrates another table of example additional delay amounts for uplink spatial relation switch delay in accordance with some embodiments.

DETAILED DESCRIPTION

Figure 1:
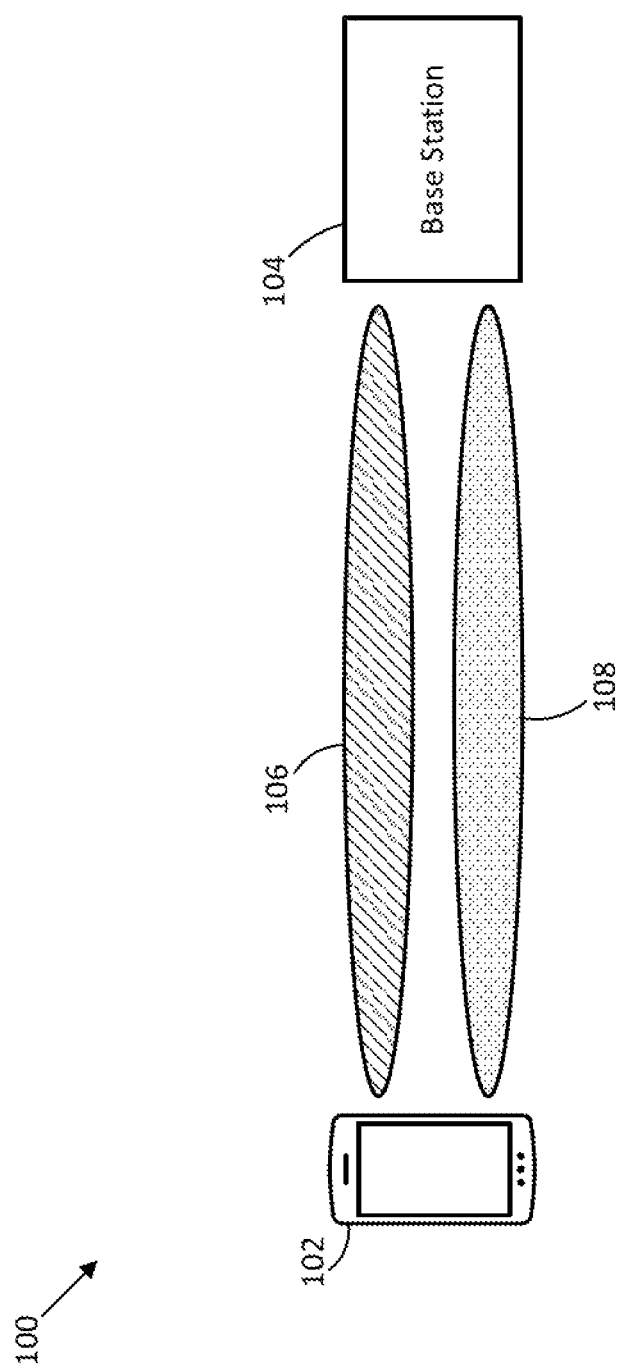
FIG. 1 illustrates an example system arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel." "link," "data link," "carer," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

A user equipment (UE) may be configured with a pathloss reference signal (RS) (for example, PathlossReferenceRS) to measure reference signal power to determine pathloss for the uplink (UL) signal in order to determine transmit power. For example, the UE may determine a pathloss for a UL signal based on a measured reference signal power of the pathloss RS. The UE may determine a transmit power for a UL signal based on the determined pathloss for the UL signal. The details of UL signal power and pathloss are provided in TS 38.213 (3GPP Organizational Partners. (2020 September). $3^{rd}$ *Generation Partnership Project; Technical Specification Group Radio Access Network; NR; Physical layer procedures for control* (*Release* 16) (3*GPP TS* 38.213 *V.* 16.3.0)) Section 7.1.1, 7.2.1, 7 3.1.

The UE may be configured with UL spatial relation information for UL signals to determine the spatial filter for transmission of the UL signal. For example, the UE may determine a spatial filter for transmission of a UL signal based on UL spatial relation information for the UE signal.

A UL spatial relation switch may be performed to switch a beam utilized by the UE for transmission of the UL signals. In particular, the UL spatial relation switch may cause the UE to transition to a different beam for transmission of the UL signals. FIG. 1 illustrates an example system arrangement 100 in accordance with some embodiments. In particular, the system arrangement 100 shows a possible UL spatial relation switch in accordance with embodiments herein.

Figure 12:
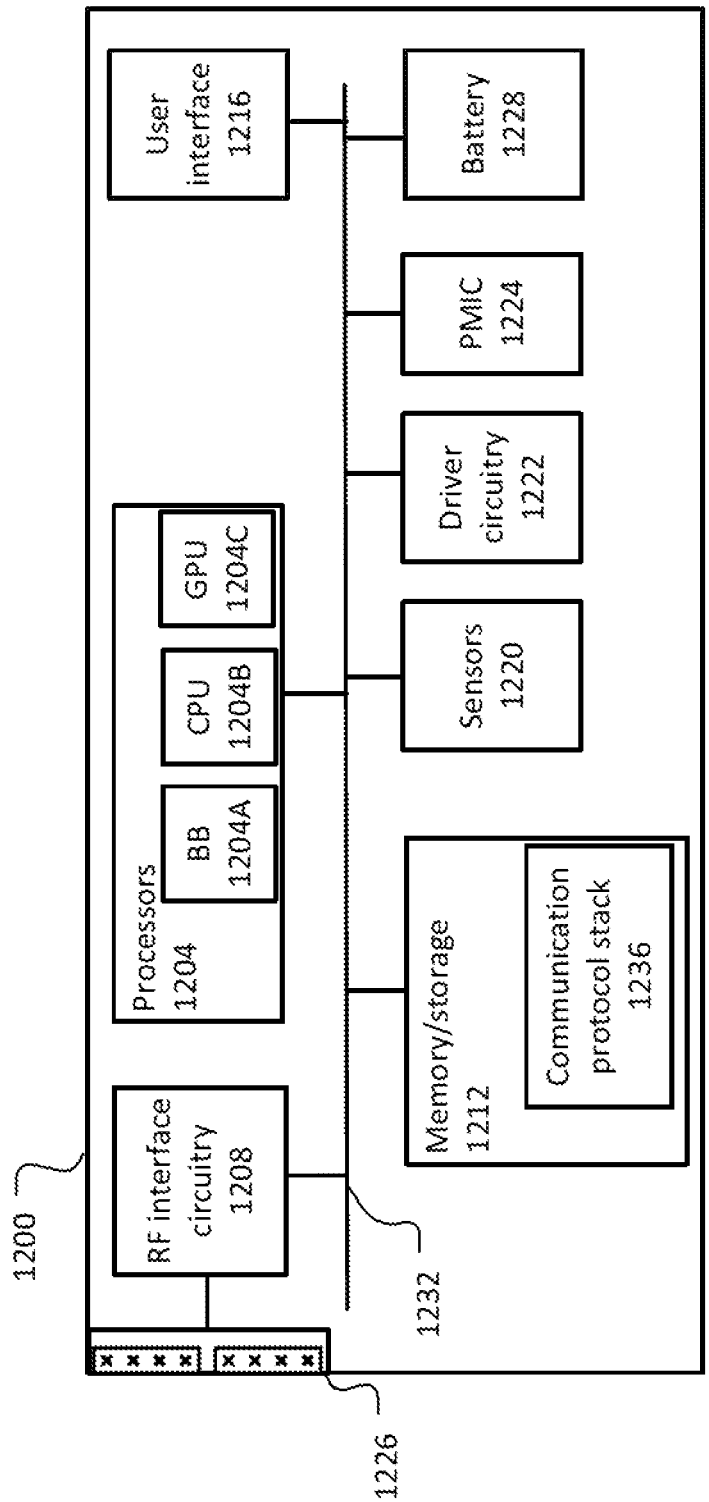
FIG. 12 illustrates an example user equipment in accordance with some embodiments.
Figure 13:
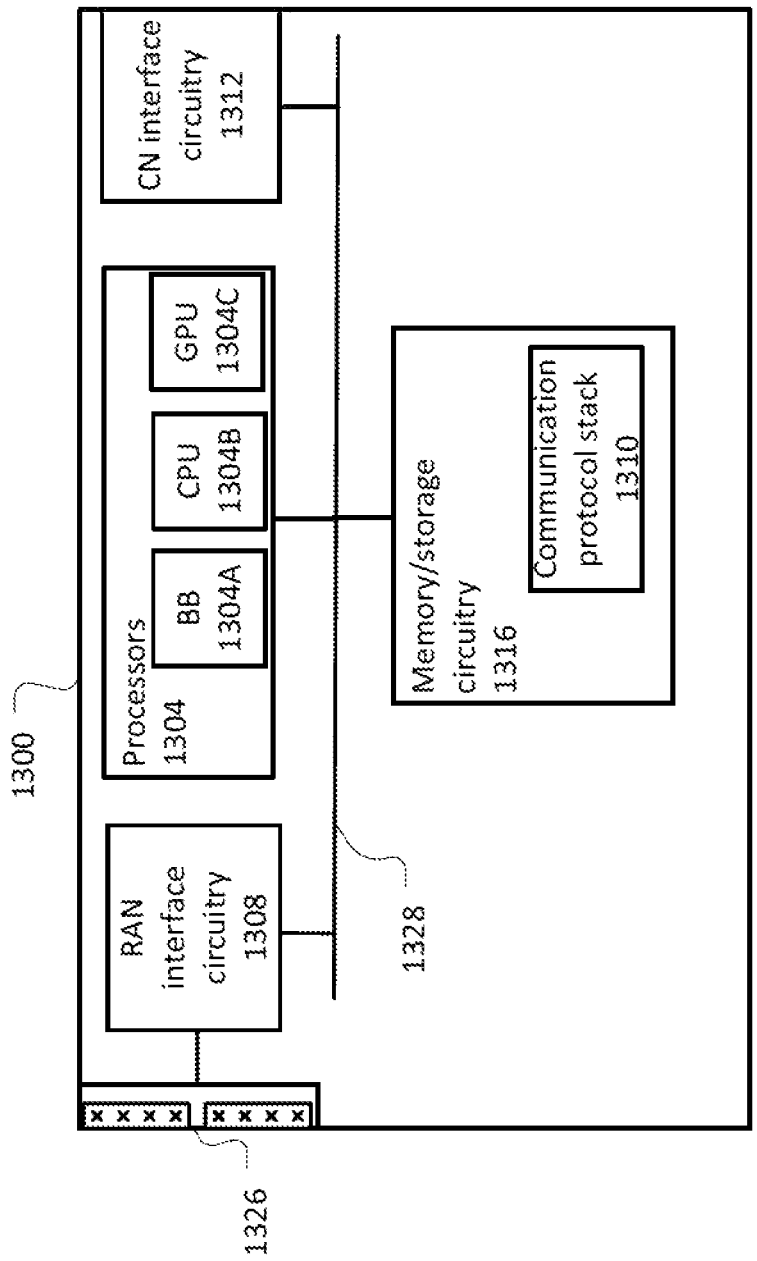
FIG. 13 illustrates an example gNB in accordance with some embodiments.

The system arrangement 100 may include a UE 102 and a base station 104. The UE 102 may include the features of the UE 1200 (FIG. 12). Further, the base station 104 may include the features of the gNB 1300 (FIG. 13). The UE 102 and the base station 104 may communicate via one or more beams in some embodiments. For example, the UE 102 may communicate UL signals via one or more beams with the base station 104. The UE 102 may be configured with a certain beam to communicate with the base station 104 at a time.

The system arrangement 100 may further include a first beam 106 and a second beam 108. While two beams are shown, it is to be understood that there may be one or more beams for communication between the UE 102 and the base station 104, and the two beams are shown to illustrate an example of operation of the beams. The first beam 106 and the second beam 108 may be utilized for communication between the UE 102 and the base station 104. The UE 102 and/or the base station 104 may be configured to utilize a particular beam for a communication. For example, the UE 102 may be configured to communicate UL signals via one of the of the beams, such as the first beam 106. A spatial relation switch procedure may be implemented to switch the beam to be utilized by the UE 102 and/or the base station 104 for transmission of signals. In particular, a UL spatial relation switch procedure may be implemented to switch the beam utilized by the UE 102 for UL signals. A UL spatial relation switch may be triggered to cause the UE 102 to be reconfigured from utilizing one beam for UL signal transmission to utilizing a different beam for UL signal transmission, such as causing the UE 102 to be reconfigured from utilizing the first beam 106 for UL signal transmission to utilizing the second beam 108 for UL signal transmission. Reconfiguring the UE 102 from the first beam 106 to the second beam 108 may comprise the UE 102 changing from utilizing a spatial filter corresponding to the first beam 106 to utilizing a spatial filter corresponding to the second beam 108.

The spatial relation switch procedure may include a switching delay for the procedure to be completed. In particular, a delay (e.g., a switching delay) may be implemented to provide time for determining a spatial filter to which UL signal transmission is to be transitioned, time for completion to the transition to the spatial filter, and/or time for configuring the UE 102 and/or the base station 104 for the spatial filter to which the UL signal transmission is being transitioned. Approaches described herein may define the switching delay for a UL spatial relation switch to switch beams utilized by the UE 102 for transmission of UL signals to the base station 104. While the example provided illustrates switching of beams for transmission from the UE 102 to a single base station 104, it should be understood that a UL spatial relation switch may cause the UE 102 to transition between beams directed to different base stations or transmit-receive points (TRPs) in some instances.

An uplink spatial switch delay may be defined based on Section 8.12 of TS 38.133 (3GPP Organizational Partners (2020 September). *3$^{rd}$ Generation Partnership Project; Technical Specification Group Radio Access Network; NR; Requirements for support of radio resource management (Release 16)* (*3GPP TS* 38.133). TS 38.133 requirements for uplink spatial relation information switch ae specified in Section 8.12. The requirements may be applicable to active spatial relation switch associated with a downlink reference signal (DL-RS).

The requirements provided in the section 8.12 may apply to UEs configured with one or more spatial relation configurations. The UEs to which the requirements are applicable may be operating in multi-radio dual connectivity (MR-DC) on a serving cell or may be standalone new radio (NR). Section 8.12 may indicate that a UE shall complete a switch of active spatial relation within a certain delay, where the delay may be defined as the switching delay described throughout this disclosure. The conditions for known spatial relation associated with a DL-RS is specified in section 8.12.2 of the TS 38.133.

The uplink spatial relation switch delay requirements may apply for a UE configured with one or more spatial relation configurations on a serving cell in MR-DC or standalone new radio (NR). There is no requirement when the UE is requested to switch to a spatial relation with the higher layer parameter spatialRelationInfo associated to sounding reference signal (SRS). UE may complete the switch of active spatial relation within the delay defined in section 8.12 when the UE is requested to switch to a spatial relation with the higher layer parameter spatialRelationInfo associated to a downlink reference signal (DL RS).

Known conditions for spatial relation when associated with DL-RS may be as follows.

The spatial relation associated to DL RS may be known if the following three conditions are met. First, during the period for the last transmission of the DL RS resource used for the layer 1 reference signal received power (L1-RSRP) measurement reporting for the target spatial relation to the completion of active spatial relation, where the DL RS resource for L1-RSRP measurement is the DL RS in target spatial relation or quasi-co-located (QCLed) to the target spatial relation with quasi-co-location (QCL) type-D. Second, a spatial relation switch command is received within 1280 milliseconds (ms) upon the last transmission of the DL RS resource for beam reporting or measurement. Third, the UE has sent at least 1 L1-RSRP report for the target spatial relation before the spatial relation switch command. 4) The DL RS configured in spatial relation remains detectable during the spatial relation switching period. 5) signal-to-noise ratio (SNR) of the DL RS configured in spatial relation is greater than or equal to −3 decibels (dB). 6) The synchronization signal/physical broadcast channel block (SSB) (or channel state information reference signal (CSI-RS) in some embodiments) associated with the spatial relation remain detectable during the spatial relation switching period. 7) SNR of the SSB (or the CSI-RS in some embodiments) associated with the spatial relation is greater than or equal to −3 dB. Otherwise, the spatial relation is unknown.

FIG. 2 illustrates a table 200 of example triggering methods in accordance with some embodiments. The uplink spatial relation switch associated with DL-RS for a uplink signal could be triggered by radio resource control (RRC) or medium access control-control element (MAC-CE) or downlink control information (DC) as shown in the table 200. A triggering method may depend on a physical layer channel. For example, a physical uplink control channel (PUCCH) may have UL spatial relation switch triggered via RRC. In other instances, the PUCCH may have UL spatial relation switch triggered via MAC-CE. A periodic sounding reference signal (P-SRS) channel may have UL spatial relation switch triggered via RRC. A semi-periodic sounding reference signal (P-SRS) channel may have UL relation switch triggered via MAC-CE. An aperiodic sounding reference signal (A-SRS) channel may have UL spatial relation switch triggered via DCI. A signal may be provided via the triggering method for the channel to trigger a UL spatial relation switch procedure.

FIG. 3 illustrates an example UL spatial relation information element (IE) 300 in accordance with some embodiments. The uplink spatial relation IE for PUCCH includes PathlossReferenceRS-Id. In particular, the UL spatial relation IE 300 may include a pathloss reference signal identifier (PathlossReferenceRS-Id) 302 for PUCCH. The PathlossReferenceRS-Id 302 may be included within the UL spatial relation IE 300 along with other UL spatial relation information that may be utilized for a UL spatial relation switch. Unless otherwise described, the parameters of the UL spatial relation IE may be similar to those described with respect to PUCCH-SpatialRelationInfo in TS 38.331 (3GPP Organizational Partners (2020 September). *3$^{rd}$ Generation Partnership Project; Technical Specification Group Radio Access Network; NR; Radio Resource Control (RRC) protocol specification (Release 16)* (3GPP TS 38.331).

The legacy definition of known/unknown spatial relation or the delay requirements for spatial relation information switch do not account for the pathloss measurement based on the PathlossReferenceRS-Id associated with the switch. Approaches described herein may account for PathlossReferenceRS measurements during a spatial relation information switch.

For PUCCH, the spatial relation information switch can be triggered by RRC or MAC-CE. For example, the spatial relation information switch can be triggered by RRC or MAC-CE in accordance with the triggering methods described in relation to the table 200. The change to PUCCH spatial relation information could also change the pathloss reference reference signal (RS). For example, the pathloss reference RS to be utilized by the UE for measuring the pathloss may be updated along with the spatial relation information switch. The pathloss reference RS could have a different reception (RX) beam than the DL-RS associated with UL spatial relation information. The target pathloss reference RS could be known or unknown. The target pathloss reference RS could be newly activated and not measured previously. For example, the pathloss reference RS to which the change is being indicated may be a target pathloss reference RS for determining a pathloss measurement. The pathloss corresponding to the target pathloss reference RS may be known (such as having been previously measured and the information related to the target pathloss reference RS being stored by the UE) or unknown. In some embodiments, the measurement of the target pathloss reference RS that produced the stored measurement of the pathloss may be required to be within a certain period of time before the trigger to be considered known, whereas if the measurement occurred prior to the period of time the pathloss may be considered unknown. In some instances, pathloss measurement of the target pathloss reference RS may be activated based on the trigger to switch to the targeted pathloss reference RS and may not have been measured prior to the switch to the targeted pathloss reference RS.

In a first case (referred to as Case 1), the target UL spatial relation information and pathloss reference RS are in the same transmission configuration indicator (TCI) chain (with quasi-co-location (QCL) Type-D). For example, case 1 may occur when the target UL spatial relation information and the pathloss reference RS are included in a same TCI chain. As used herein, the pathloss reference RS may be in a same TCI chain as the target UL spatial relation information with QCL Type-D. QCL relationship is one RS to another, more uni-directional. The TCI chain is used to indicate RSs QCLed with the same type. For example, CSI-RS1 is QCLed to CSI-RS3, CSI-RS3 is QCLed to CSI-RS4, CSI-RS4 is QCLed to SSB1, and CSI-RS1, CSI-RS3, CSI-RS4 and SSB1 are in the same TCI chain. The known definition for case 1 may be based on target UL spatial relation information. For example, a switching delay for the UL spatial relation switch in case 1 may be defined based on the target UL spatial relation information.

In a second case (referred to as Case 2), the target UL spatial relation information and pathloss reference RS are not in the same TCI chain. For example, case 2 may occur when the target UL spatial relation information and the pathloss reference RS are in different TCI chains. The known definition for case 2 may be based on the target UL spatial relation information and the pathloss reference RS. For example, a switching delay for the UL spatial relation switch in case 2 may be defined based on the target UL spatial relation information and the pathloss reference RS.

In a first instance of case 2 (referred to as Case 2a), the target UL spatial relation and pathloss reference RS may be known. For example, case 2a may occur when the target UL spatial relation and a pathloss corresponding to the pathloss reference RS is known. In a second instance of case 2 (referred to as Case 2b), the target UL spatial relation may be unknown and the pathloss reference RS may be known. For example, case 2b may occur when the target UL spatial relation is unknown and a pathloss corresponding to the pathloss reference RS is known. In a third instance of case 2 (referred to as Case 2c), the target UL spatial relation may be known and the pathloss reference RS may be unknown. For example, case 2c may occur when the target UL spatial relation is known and a pathloss corresponding to the pathloss reference RS is unknown. In a fourth instance of case 2 (referred to as Case 2d), the target UL spatial relation and the pathloss reference RS may be unknown. For example, case 2d may occur when the target UL spatial relation is unknown and a pathloss corresponding to the pathloss reference RS is unknown.

UL spatial relation information switch delay requirement may consider: whether target UL spatial relation and pathloss reference RS are in the same TCI chain; unknown/known status of target spatial relation information; unknown/known status of pathloss reference RS; and whether pathloss reference signal (PL-RS) is newly activated or measured previously. For example an amount of the switching delay for a UL spatial relation switch based on UL spatial relation information may be based on whether target UL spatial relation information and a target pathloss reference RS are in the same TCI chain, whether the target spatial relation is known or unknown, whether a pathloss related to a pathloss reference RS is known or unknown, and/or whether PL-RS is newly activated or was measured previously.

A switching delay for a UL spatial relation switch may be equal to a set delay plus an additional delay. FIG. 4 illustrates a table 400 of example additional delay amounts for uplink spatial relation switch delay in accordance with some embodiments. The additional delay amounts shown in the table 400 may be additional delay amounts for case 1.

Recall that in case 1, the target UL spatial relation information and pathloss reference RS are in the same TCI chain (with QCL Type-D). In this case, the switching delay may include MAC CE decoding or RRC message processing delay plus an additional delay based on conditions in table 400. For example, the set delay for the switching delay for the UL spatial relation switch may comprise a MAC CE decoding delay or an RRC message processing delay. The set delay may depend on the trigger method. For example, when the triggering method is RRC the set delay may comprise the RRC message processing delay and when the triggering method is MAC-CE the set delay may comprise the MAC CE decoding delay.

The additional delays shown in the table 400 may be added to the set delay to produce the switching delay. For example, the switching delay may be equal to or greater than the set delay plus the additional delay shown in table 400 for case 1. The additional delay for a UL spatial relation for case 1 may be based on whether UL spatial relation is known or unknown, and/or whether PL-RS was previously measured or activated.

As shown in the table 400, in situations where the UL spatial relation is known and the PL-RS was previously measured or activated, the additional delay may be not applicable (e.g., the additional delay may be equal to 0). In situations where the UL spatial relation is known and the PL-RS was not previously measured or activated, the additional delay may be equal to the time for target PL-RS measurement (e.g., the PL-RS measurement/activation delay), where PL-RS measurement/activation delay could be defined as $5*T_{TargetPL-RS}+2$ ms. $T_{TargetPL-RS}$ may be a periodicity of the target PL-RS. In situations where the UL spatial relation is unknown and the PL-RS was previously measured or activated, the additional delay may be equal to the time for RX beam refinement (e.g., the RX beam refinement delay) for the target UL spatial relation, where the RX beam refinement delay could be defined as $T_{L1-RSRP}$. $T_{L1-RSRP}$ may be a time for L1-RSRP measurement of SSB or CSI-RS associated with target UL spatial relation. In some embodiments, in situations where the UL spatial relation is unknown and the PL-RS was not previously measured or activated the additional delay may be equal to the time for RX beam refinement plus the time for target PL-RS measurement. In other embodiments, in situations where the UL spatial relation is unknown and the PL-RS was not previously measured or activated the additional delay may be the greater of the time for RX beam refinement or the time for target PL-RS measurement. Accordingly, in situations where the UL spatial relation is unknown and the PL-RS was not previously measured or activated, the additional delay (e.g., the combined delay) could be defined as the either $\max\{T_{L1-RSRP}, 5*T_{TargetPL-RS}+2 \text{ ms}\}$; or $T_{L1-RSRP}\pm 5*T_{TargetPL-RS}+2$ ms.

FIG. 5 illustrates another table 500 of example additional delay amounts for uplink spatial relation switch delay in accordance with some embodiments. The additional delay amounts shown in the table 500 may be additional delay amounts for case 5.

Recall that in case 2, the target UL spatial relation information and pathloss reference RS are not in the same TCI chain (with QCL Type-D). In this case, the switching delay may include the MAC CE decoding or RRC message processing delay plus additional delay based on conditions in table 500. For example, the set delay for the switching delay for the UL spatial relation switch may comprise a MAC CE decoding delay or an RRC message processing delay. The set delay may depend on the trigger method. For example, when the triggering method is RRC the set delay may comprise the RRC message processing delay and when the triggering method is MAC-CE the set delay may comprise the MAC CE decoding delay.

The additional delays shown in the table 500 may be added to the set delay to produce the switching delay. For example, the switching delay may be equal to or greater than the set delay plus the additional delay shown in table 500 for case 2. The additional delay for a UL spatial relation for case 2 may be based on whether UL spatial relation is known or unknown, whether a pathloss corresponding to the PL-RS is known or unknown, and/or whether PL-RS was previously measured or activated.

As shown in the table 500, in situations where the UL spatial relation is known, the pathloss corresponding to the PL-RS is known, and the PL-RS was previously measured or activated the additional delay may be not applicable (e.g., the additional delay may be equal to 0). In situations where the UL spatial relation is known, the pathloss corresponding to the PL-RS is unknown, and the PL-RS was previously measured or activated the additional delay may be equal to the time for RX beam refinement for the target PL-RS (e.g., the RX beam refinement delay for PL-RS), where the RX beam refinement delay for PL-RS could be defined as $T_{L1\text{-}RSRP\text{-}PL\text{-}RS}$. In situations where the UL spatial relation is known, the pathloss corresponding to the PL-RS is known, and the PL-RS was not previously measured or activated the additional delay may be equal to the time for target PL-RS measurement (e.g., the PL-RS measurement/activation delay), where PL-RS measurement/activation delay could be defined as $5*T_{TargetPL\text{-}RS}+2$ ms. In situations where the UL spatial relation is known, the pathloss corresponding to the PL-RS is unknown, and the PL-RS is not measured or activated, the additional delay may be equal to a time for RX beam refinement for target PL-RS and target PL-RS. In situations where the UL spatial relation is unknown, the pathloss corresponding to the PL-RS is known, and the PL-RS was previously measured or activated, the additional delay may be equal to the time for RX beam refinement (e.g., the RX beam refinement delay) for the target LL spatial relation, where the RX beam refinement delay for UL spatial relation could be defined as $T_{L1\text{-}RSRP\text{-}UL\text{-}SpRel}$. In situations where the UL spatial relation is unknown, the pathloss corresponding to the PL-RS is unknown, and the PL-RS was previously measured or activated, the additional delay may be equal to the time for RX beam refinement for target UL spatial relation and the time for RX beam refinement for the target PL-RS. In situations where the UL spatial relation is unknown, the pathloss corresponding to the PL-RS is known, and the PL-RS was not previously measured or activated the additional delay may be equal to the time for RX beam refinement for the target UL spatial relation and the time for target PL-RS measurement. In situations where the UL spatial relation is unknown, the pathloss corresponding to the PL-RS is unknown, and the PL-RS was not previously measured or activated, the additional delay may be equal to the time for RX beam refinement for the target L1 spatial relation, the time for RX beam refinement for the target PL-RS, and the time for the target PL-RS measurement.

When delay needs to account for multiple components it may be based on a maximum of the individual components, a sum of each of the individual components, or a combination of the sum and maximum. In particular, when the additional delay includes more than one component of the time for RX beam refinement for the target PL-RS, the time for RX beam refinement for the UL spatial relation, and the time for the target PL-RS measurement, the additional delay may be equal to the sum of the components or the greatest of the components. For example, in the instance where the additional delay is equal to the time for RX beam refinement for the target PL-RS and the time for the target PL-RS measurement, the additional delay may be equal to the sum of the time for RX beam refinement for the target PL-RS and the time for the target PL-RS measurement, or the greater of the time for RX beam refinement for the target PL-RS and the time for the target PL-RS measurement. In the instance where the additional delay is equal to the time for RX beam refinement for the target UL spatial relation and the time for the target PL-RS measurement, the additional delay may be equal to the sum of the time for RX beam refinement for the target UL spatial relation and the time for the target PL-RS measurement, or the greater of the time for RX beam refinement for the target UL spatial relation and the time for the target PL-RS measurement.

In the instance where the additional delay is equal to the time for RX beam refinement for the target UL spatial relation and the time for RX beam refinement for the target PL-RS, the additional delay may be equal to the sum of the time for RX beam refinement for the target UL spatial relation and the time for RX beam refinement for the targeted PL-RS, or the greater of the time for RX beam refinement for the target UL spatial relation and the time for RX beam refinement for the target PL-RS. In the instance where the additional delay is equal to the time for RX beam refinement for the target UL spatial relation, the time for RX beam refinement for the target PL-RS, and the time for the target PL-RS measurement, the additional delay may be equal to the sum of the time for RX beam refinement for the target UL spatial relation, the time for RX beam refinement for the target PL-RS, and the time for the target PL-RS measurement, or the greatest of the time for RX beam refinement for the target UL spatial relation, the time for RX beam refinement for the target PL-RS, and the time for the target PL-RS measurement.

Figure 6:
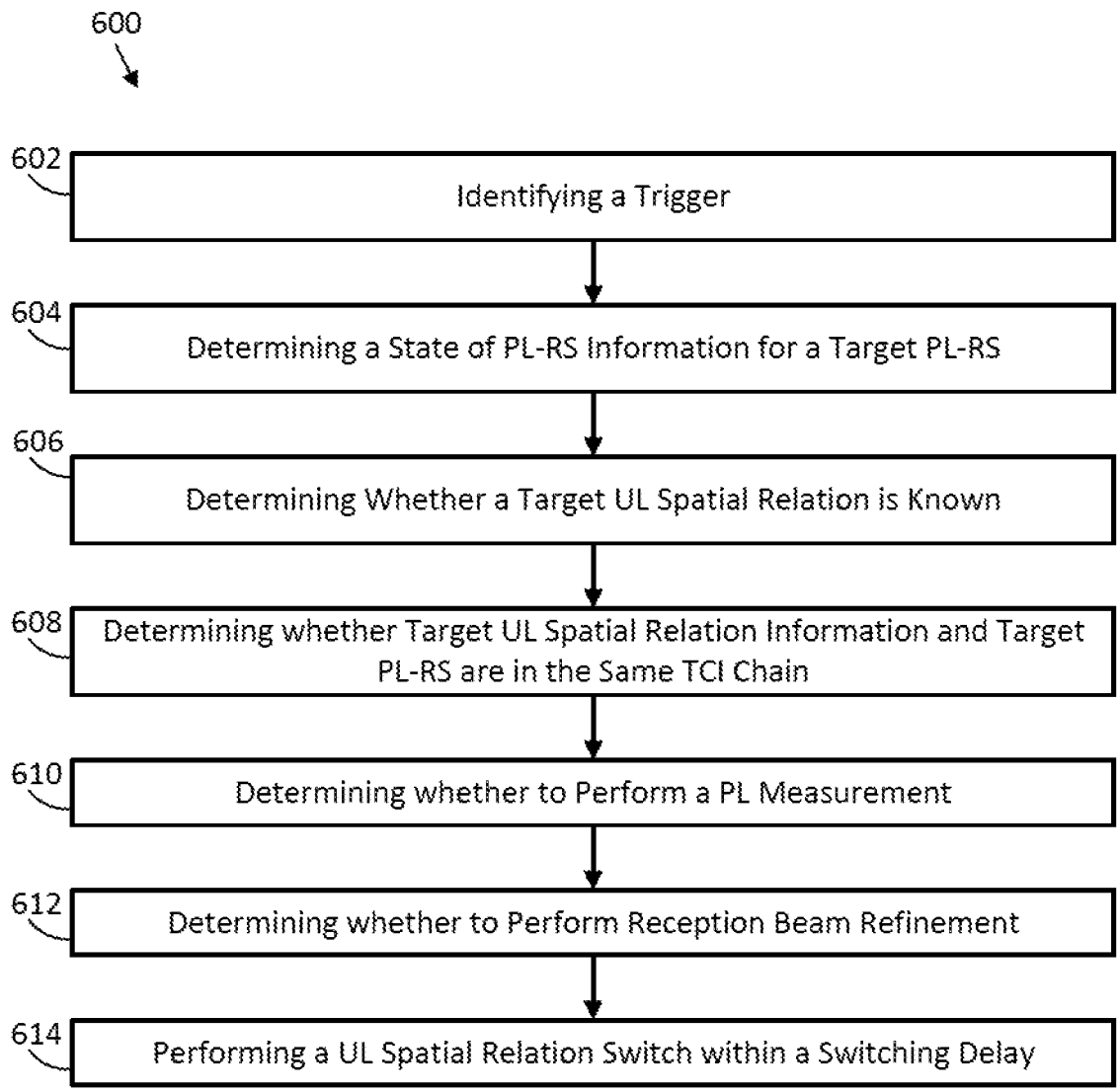
FIG. 6 illustrates an example procedure for performing a UL spatial relation switch in accordance with some embodiments.

FIG. 6 illustrates an example procedure 600 for performing a UL spatial relation switch in accordance with some embodiments. The procedure 600 may be performed by a UE, such as the UE 102 or the UE 1200 (FIG. 12), or components thereof, for example, baseband processor circuitry 1204A (FIG. 12). The procedure 600 may be performed as part of a UL spatial relation switch operation.

The procedure 600 may include identifying a trigger in 602. In particular, the UE may identify a trigger for a UL spatial relation switch in 602. The trigger may be received by the UE via RRC or MAC-CE as described in relation to the table 200 (FIG. 2). The trigger may comprise a communication received via the RRC or the MAC-CE that indicates a UL spatial relation switch is to be performed by the UE. In some embodiments, the communication may comprise a UL spatial relation information element (such as the UL spatial relation IE 300 (FIG. 3)) with updated UL spatial relation information and/or updated pathloss reference RS. The triggering method (e.g., reception via the RRC or the MAC-CE) may depend on the PHY channel, as described in relation to the table 200.

The procedure 600 may include determining a state of PL-RS information for a target PL-RS in 604. In particular, the UE may determine a state of the PL-RS information for a target PL-RS of the UL spatial relation switch. Determining the state of the PL-RS information may include determining whether the target PL-RS was previously measured or activated, and/or determining whether the target PL-RS is known. The characteristic that may be used for determining whether the target PL-RS is known may comprise a pathloss corresponding to the PL-RS in some embodiments. The determination of the state of the PL-RS information for the target PL-RS may be performed based on the identification of the trigger in 602. The operations performed for determining the state of the PL-RS information may depend on whether case 1 or case 2 is being implemented. For example, in case 1 implementations determining the state of the PL-RS may include determining whether the target PL-RS was previously measured or activated in some embodiments. In case 2 implementations determining the state of the PL-RS may include determining whether the target PL-RS was previously measured or activated, and determining whether the target PL-RS is known in some embodiments. The UE may be configured for the case to be implemented.

The procedure 600 may include determining whether a target UL spatial relation is known in 606. In particular, the UE may determine whether a target UL spatial relation is known for the UL spatial relation switch. The determination of whether a target UL spatial relation is known may be performed based on the identification of the trigger in 602.

The procedure 600 may include determining whether the target UL spatial relation information and the target PL-RS are in the same TCI chain in 608. In particular, the UE may determine whether the target UL spatial relation information and the target PL-RS are in the same TC chain. For example, the UE may determine that the target UL spatial relation information and the target PL-RS are in the same TCI chains in some instances. In other instances, the UE may determine that the target UL spatial relation information and the target PL-RS are in different TCI chains.

The procedure 600 may include determining whether to perform a PL measurement in 610. The UE may determine whether to perform a PL measurement on the target PL-RS based on the state of the PL-RS information for the target PL-RS. For example, if the UE determines that the target PL-RS had not been previously measured or activate, the UE may determine that that a PL measurement is to be performed on the target PL-RS.

The procedure 600 may include determining whether to perform reception beam refinement in 612. In particular, the UE may determine whether to perform reception beam refinement based on whether the target UL spatial relation is known and/or whether the PL-RS is known. For example, if the UE determines that the target UL spatial is unknown, the UE may determine to perform reception beam refinement for the target UL spatial relation. If the UE determines that the target UL spatial relation information and the target PL-RS are in different TCI, the UE may determine whether the PL-RS is known and may determine that reception beam refinement for the target PL-RS is to be performed.

The procedure 600 may include performing a UL spatial relation switch within a switching delay in 614. In particular, the UE may complete the UL spatial relation switch within a switching delay. For example, the UE may switch to a different beam for UL communications at the end of the switching delay. The switching delay may depend on the state of the PL-RS information, whether the target UL spatial relation is known, and whether the target UL spatial relation information and the target PL-RS are in the same TCI chain, as described throughout this disclosure.

The switching delay may include the set delay and the additional delay as described in relation to FIG. 4 and FIG. 5. For example, the UE may determine the set delay to be equal to the MAC CE decoding delay when the trigger is received via MAC-CE in 602 and the set delay to be equal to the RRC message processing delay when the trigger is received via RRC in 602. The UE may determine the additional delay in accordance with the table 400 for case 1 and table 500 for case 2. The UE may add the set delay with the additional delay to produce the switching delay.

In some embodiments, the UE may provide an indication of the determined switching delay to a connected nodeB (such as the gNB 1300 (FIG. 13)). Accordingly, the nodeB may be aware of the switching delay for the UE. The nodeB may be configured with the switching delay indicated by the UE and may schedule communications with the UE in accordance with the switching delay. For example, the nodeB may schedule for the UL spatial relation switch to be completed at an end of the switching delay. In other embodiments, the indication of the determined switching delay provided by the UE to the nodeB may be omitted.

Figure 7:
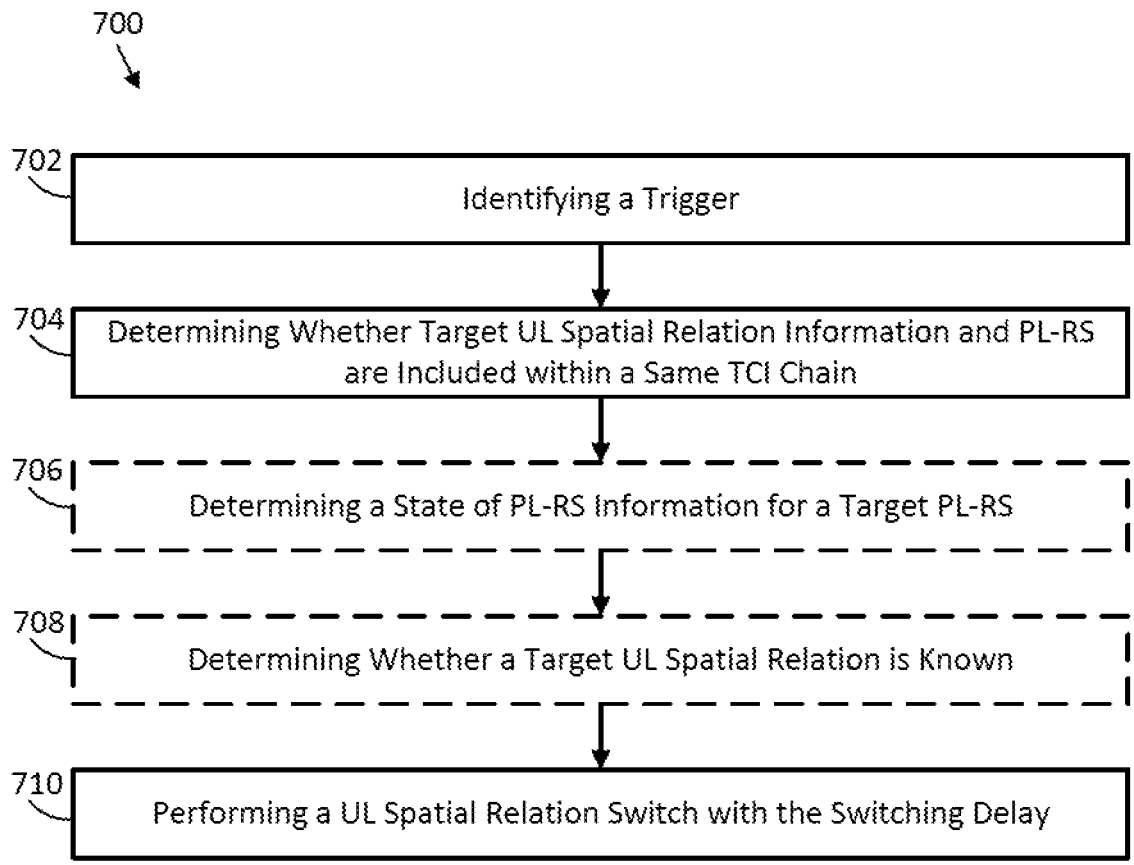
FIG. 7 illustrates another example procedure for performing a UL spatial relation switch in accordance with some embodiments.

FIG. 7 illustrates another example procedure 700 for performing a UL spatial relation switch in accordance with some embodiments. The procedure 700 may be performed by a UE, such as the UE 1200 (FIG. 12). The procedure 700 may be performed as part of a UL spatial relation switch operation.

The procedure 700 may include identifying a trigger in 702. In particular, the UE may identify a trigger for a UL spatial relation switch in 702. The trigger may be received by the UE via RRC or MAC-CE as described in relation to the table 200 (FIG. 2). The trigger may comprise a communication received via the RRC or the MAC-CE that indicates a UL spatial relation switch is to be performed by the UE. In some embodiments, the communication may comprise a UL spatial relation information element (such as the UL spatial relation IE 300 (FIG. 3)) with updated UL spatial relation information and/or updated pathloss reference RS. The triggering method (e.g., reception via the RRC or the MAC-CE) may depend on the PHY channel, as described in relation to the table 200.

The procedure 700 may include determining whether target UL spatial relation information and the target PL-RS are included within a same TCI chain in 704. In particular, the UE may determine whether the UL spatial relation information and the target PL-RS are included within the same TCI chain. The determination whether the UL spatial relation information and the target PL-RS are within the same TCI chain may be performed based on the identification of the trigger in 702. The UL spatial relation information and the target PL-RS may be indicated in the UL spatial relation information element identified in 702. Based on whether the UL spatial relation and the target PL-RS are in the same TCI chain, the UE may determine whether case 1 or case 2 applies. In particular, the UE may determine that case 1 is to be applied when the UL spatial relation and the target PL-RS are in the same TC chain, and the UE may determine that case 2 is to be applied when the UL spatial relation and the target PL-RS are in different TCI chains.

The procedure 700 may include determining a state of PL-RS information for a target PL-RS in 706. In particular, the UE may determine a state of the PL-RS information for a target PL-RS of the UL spatial relation switch. Determining the state of the PL-RS information may include determining whether the target PL-RS was previously measured or activated, and/or determining whether the target PL-RS is known. The characteristic that may be used for determining whether the target PL-RS is known may comprise a pathloss corresponding to the PL-RS in some embodiments. The determination of the state of the PL-RS information for the target PL-RS may be performed based on the identification of the trigger in 702. The operations performed for determining the state of the PL-RS information may depend on whether case 1 or case 2 is being implemented. For example, in case 1 implementations determining the state of the PL-RS may include determining whether the target PL-RS was previously measured or activated in some embodiments. In case 2 implementations determining the state of the PL-RS may include determining whether the target PL-RS was previously measured or activated, and determining whether the target PL-RS is known in some embodiments. Whether 706 is performed, and whether case 1 or case 2 procedures related to 706 are to be implemented may depend on the determination of whether the target UL spatial relation information and the target PL-RS are included within the same TCI chain in 704.

The procedure 700 may include determining whether a target UL spatial relation is known in 708. In particular, the UE may determine whether a target UL spatial relation is known for the UL spatial relation switch. The determination of whether a target UL spatial relation is known may be performed based on the identification of the trigger in 702. Whether 708 is performed, may depend on the determination of whether the target UL spatial relation information and the target PL-RS are included within the same TCI chain in 704.

The procedure 700 may include performing a UL spatial relation switch within a switching delay in 710. In particular, the UE may complete the UL spatial relation switch within the switching delay. For example, the UE may switch to a different beam for UL communications within the switching delay.

The switching delay may be for the UL spatial relation switch. The switching delay may be based on the determined state of the PL-RS information for the target PL-RS in 706 and the determination of whether the target UL spatial relation is known in 708. In some embodiments, the switching delay may be based further on the determination of whether the target UL spatial relation information and the target PL-RS are included within a same TCI chain in 704. The switching delay may be in accordance with the table 400 (FIG. 4) or the table 500 (FIG. 5). In particular, the switching delay may in accordance with the table 400 when case 1 is being implemented and in accordance with the table 500 when case 2 is being implemented.

The switching delay may include a set delay and an additional delay as described in relation to FIG. 4 and FIG. 5. For example, the set delay to be equal to the MAC CE decoding delay when the trigger is received via MAC-CE in 702 and the set delay to be equal to the RRC message processing delay when the trigger is received via RRC in 702. The additional delay may be in accordance with the table 400 for case 1 and table 500 for case 2. The UE may add the set delay with the additional delay to produce the switching delay.

Figure 8:
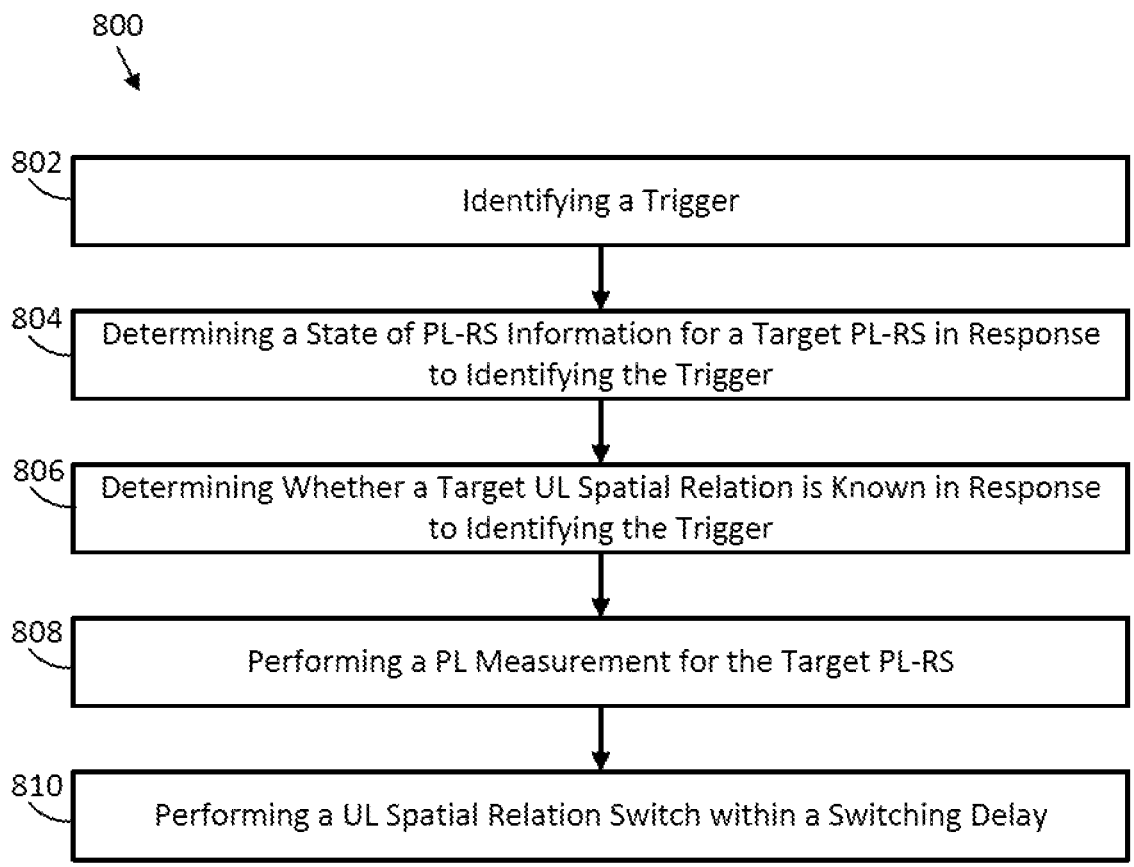
FIG. 8 illustrates an example procedure for performing a UL spatial relation switch in accordance with some embodiments.

FIG. 8 illustrates an example procedure 800 for performing a UL spatial relation switch in accordance with some embodiments. The procedure 800 may be performed by a UE, such as the UE 1200 (FIG. 12). The procedure 800 may be performed as part of a UL spatial relation switch operation.

The procedure 800 may include identifying a trigger in 802. In particular, the UE may identify a trigger for a UL spatial relation switch in 802. The trigger may be received by the UE via RRC or MAC-CE as described in relation to the table 200 (FIG. 2). The trigger may comprise a communication received via the RRC or the MAC-CE that indicates a UL spatial relation switch is to be performed by the UE. In some embodiments, the communication may comprise a UL spatial relation information element (such as the UL spatial relation IE 300 (FIG. 3)) with updated UL spatial relation information and/or updated pathloss reference RS. The triggering method (e.g., reception via the RRC or the MAC-CE) may depend on the PHY channel, as described in relation to the table 200.

The procedure 800 may include determining a state of PL-RS information for a target PL-RS in 804. In particular, the UE may determine a state of the PL-RS information for a target PL-RS of the UL spatial relation switch. Determining the state of the PL-RS information may include determining whether the target PL-RS was previously measured or activated, and/or determining whether a the target PL-RS is known. The characteristic that may be used for determining whether the target PL-RS is known may comprise a pathloss corresponding to the PL-RS in some embodiments. The determination of the state of the PL-RS information for the target PL-RS may be performed based on the identification of the trigger in 802. The operations performed for determining the state of the PL-RS information may depend on whether case 1 or case 2 is being implemented. For example, in case 1 implementations determining the state of the PL-RS may include determining whether the target PL-RS was previously measured or activated in some embodiments. In case 2 implementations determining the state of the PL-RS may include determining whether the target PL-RS was previously measured or activated, and determining whether a value for the target PL-RS is known in some embodiments. The UE may be configured for the case to be implemented.

The procedure 800 may include determining whether a target UL spatial relation is known in 806. In particular, the UE may determine whether a target UL spatial relation is known for the UL spatial relation switch. The determination of whether a target UL spatial relation is known may be performed based on the identification of the trigger in 802. The determination of whether the target UL spatial relation is known may include determining whether the UE has stored UL spatial relation information for the target UL spatial relation.

The procedure 800 may include performing a PL measurement for the target PL-RS in 808. In particular, the UE may have determined that the state of the PL-RS information may have indicated that target PL-RS was not previously measured or activated in 804. Based on the target PL-RS not being previously measured or activated, the UE perform a PL measurement of the target PL-RS to determine a PL of the target PL-RS. The PL measurement may be performed within a switching delay.

The procedure 800 may include performing the UL spatial relation switch within a switching delay in 810. In particular, the UE may perform the UL spatial relation switch within a switching delay related to the UL spatial relation switch. The switching delay may be based on the determined state of the PL-RS information for the target PL-RS in 804 and the determination of whether the target UL spatial relation is known in 806. The switching delay may be in accordance with the table 400 (FIG. 4) or the table 500 (FIG. 5). In particular, the switching delay may be in accordance with the table 400 when case 1 is being implemented and in accordance with the table 500 when case 2 is being implemented.

The switching delay may include the set delay and the additional delay as described in relation to FIG. 4 and FIG. 5. For example, the set delay may be equal to the MAC CE decoding delay when the trigger is received via MAC-CE in 802 and the set delay may be equal to the RRC message processing delay when the trigger is received via RRC in 802. The additional delay may be in accordance with the table 400 for case 1 and table 500 for case 2. The set delay with the additional delay may be added to produce the switching delay.

Figure 9:
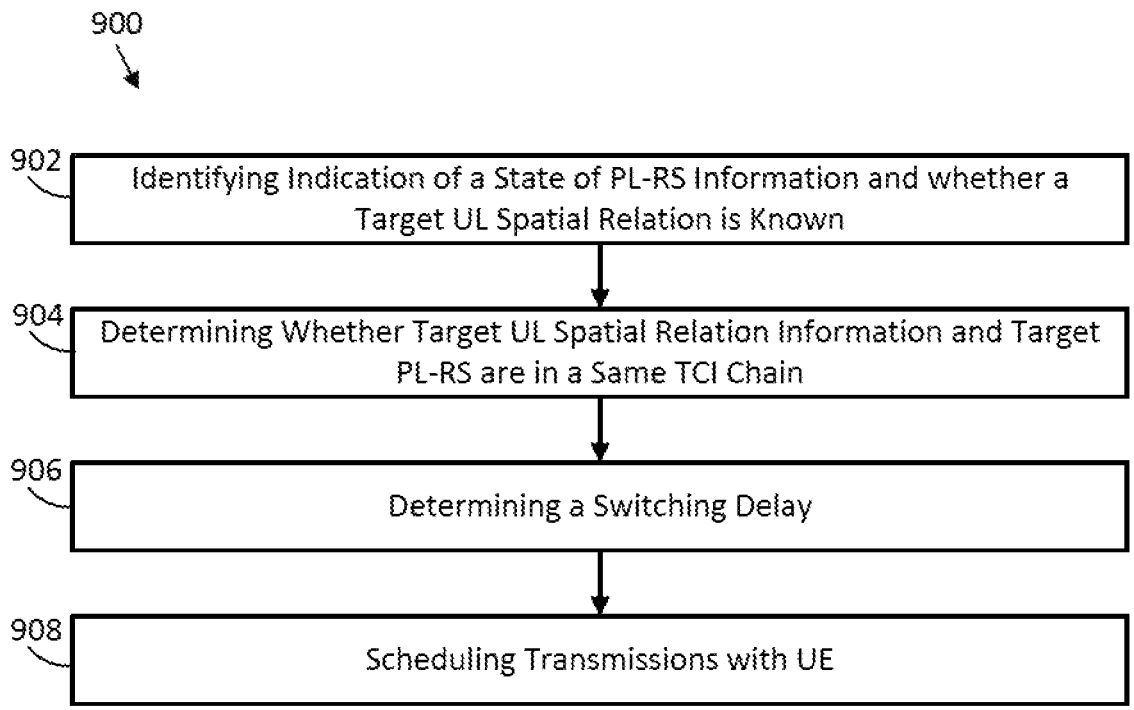
FIG. 9 illustrates an example procedure for determining a switching delay for a UL spatial relation switch in accordance with some embodiments.

FIG. 9 illustrates an example procedure 900 for determining a switching delay for a UL spatial relation switch in accordance with some embodiments. The procedure 800 may be performed by a gNB, such as the gNB 1300 (FIG. 13). The procedure 900 may be performed as part of a UL spatial relation switch operation.

The procedure 900 may include identifying an indication of a state of PL-RS information and whether a target UL spatial relation is known in 902. In particular, the gNB may identify an indication of a state of PL-RS information for a UE (such as the UE 1200 (FIG. 12)) that is to perform a UL spatial relation switch, as may be triggered by the gNB providing a trigger to the UE, and whether the UE knows the target UL spatial relation. In some embodiments, identifying the indication of the state of the PL-RS information and whether the target UL spatial relation is known may include determining, based on stored information of the gNB, whether the UE previously measured or activated the target PL-RS, whether the UE knows the target PL-RS, and/or whether the target UL spatial relation is known by the UE.

The procedure 900 may include determining whether a target UL spatial relation information and target PL-RS are in a same TCI chain in 904. In particular, the gNB may determine whether the target UL spatial relation information and the target PL-RS are in a same chain.

The procedure 900 may include determining switching delay in 906. In particular, the gNB may determine an expected switching delay corresponding to the UL spatial relation switch to be performed by the UE. The gNB may determine the switching delay based on the state of the PL-RS information, whether the target UL spatial relation is known, and/or whether the target UL spatial relation information and the target PL-RS are in the same TC chain. The switching delay may be determined by the gNB in accordance with the table 400 (FIG. 4) or the table 500 (FIG. 5). In particular, the switching delay may be determined in accordance with the table 400 when case 1 is being implemented and in accordance with the table 500 when case 2 is being implemented.

The switching delay may include the set delay and the additional delay as described in relation to FIG. 4 and FIG. 5. For example, the set delay may be equal to the MAC CE decoding delay when the trigger is received via MAC-CE in 802 and the set delay may be equal to the RRC message processing delay when the trigger is received via RRC in 802. The additional delay may be determined by the gNB in accordance with the table 400 for case 1 and table 500 for case 2. The set delay with the additional delay may be added to produce the switching delay.

The procedure 900 may include scheduling transmissions with the UE in 908. In particular, the gNB may schedule transmissions with the UE based on the switching delay determined in 906. In some embodiments, the gNB may avoid scheduling transmissions during the switching delay and may only schedule transmissions with the UE after the switching delay has expired.

Figure 10:
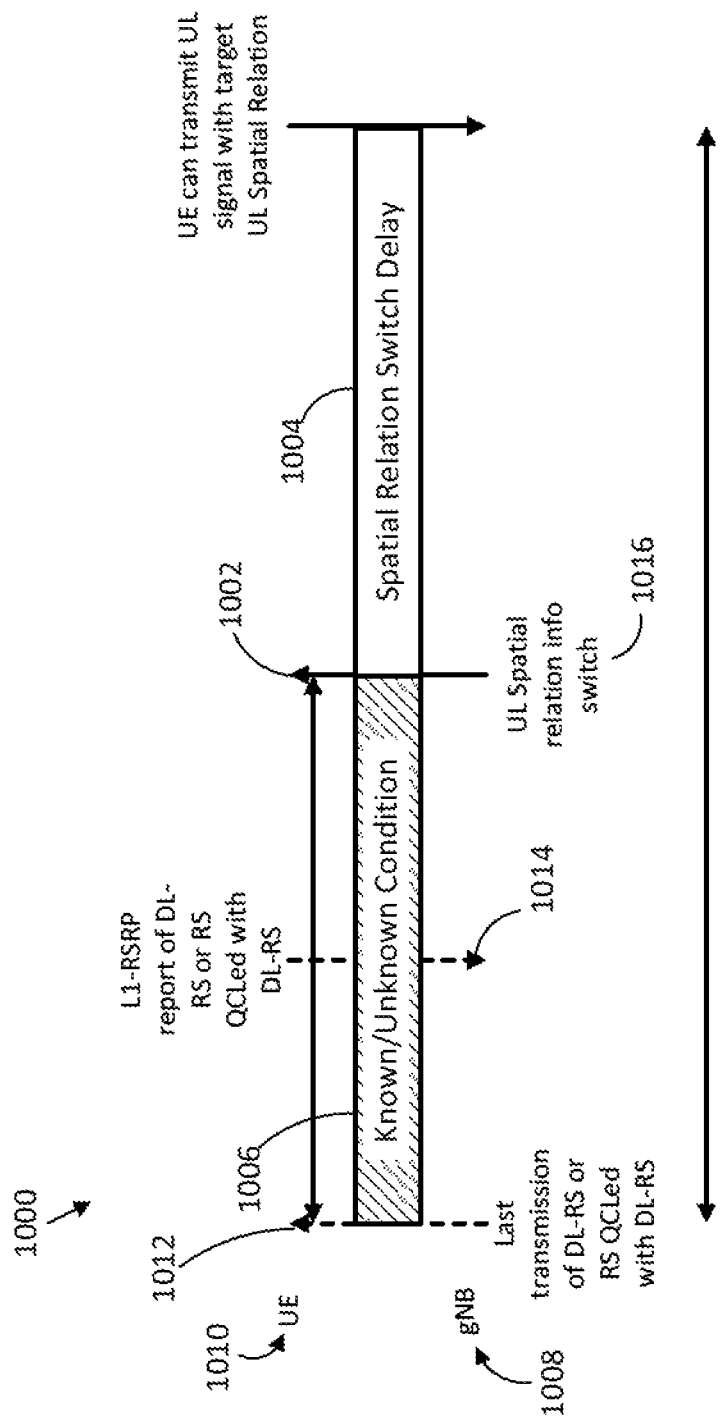
FIG. 10 illustrates an example spatial relation switch delay timing diagram in accordance with some embodiments.

FIG. 10 illustrates an example spatial relation switch delay timing diagram 1000 in accordance with some embodiments. In particular, the diagram 1000 shows an example UL spatial relation switch trigger point 1002 and a UL spatial relation switching delay 1004. The diagram 1000 further shows a time period 1006 for determining whether characteristics are known. The time period 1006 may be omitted in some embodiments.

The timing diagram 1000 illustrates an time for known condition definition. For example, the timing diagram 1000 illustrates an example of a time period for performance of a UL spatial relation information switch, including triggering signals. The timing diagram 1000 illustrates example signalling between a gNB 1008, shown at a bottom side of the line chart, and a UE 1010, shown at a top side of the line chart. Lines with arrows pointing upward indicate signals transmitted from the gNB 1008 to the UE 1010 and lines with arrows pointing downwards indicate signal transmitted from the UE 1010 to the gNB 1008. The gNB 1008 may include one or more of the features of the gNB 1300. The UE 1010 may include one or more of the features of the UE 1200.

The gNB 1008 may transmit a DL-RS or an RS QCLed with a DL-RS. In particular, the timing diagram 1000 illustrates an example of a last transmission 1012 of a DL-RS or RS QCLed with a DL-RS prior to a UL spatial relation information switch. The target spatial relation may be associated with the DL-RS. The DL-RS may comprise an SSB or a CSI-RS.

The UE 1010 may detect the last transmission 1012 received from the gNB 1008. The UE 1010 may measure a received power of the DL-RS or RS QCLed with DL-RS. The UE 1010 may transmit a L1-RSRP report 1014 of the DL-RS or RS QCLed with the DL-RS that indicates the received power.

The gNB 1008 may transmit a UL spatial relation information switch signal 1016 to the UE 1010. The UL spatial relation information switch signal 1016 may comprise the UL spatial relation IE 300 (FIG. 3) in some embodiments. The UL spatial relation information switch signal 1016 may indicate that the UE 1010 is to perform a UL spatial relation switch to a different beam. The gNB 1008 may transmit the UL spatial relation information switch signal 1016 at a set time after the last transmission 1012 of the DL-RS or the RS QCLed with the DL-RS. In some embodiments, the set time at which the UL spatial relation information switch signal 1016 is transmitted after the last transmission 1008 is 1280 ms or less.

The UE 1010 may identify a trigger for a UL spatial relation switch at the trigger point 1002. For example, the UE 1010 may have identified a trigger in accordance with 602 (FIG. 6), 702 (FIG. 7), or 802 (FIG. 8) at the trigger point 1002. In particular, the UE 1010 may identify the UL spatial relation information switch signal 1016 as a trigger. The UE 1010 may have received the UL spatial relation information switch signal 1016 at the trigger point 1002, where the communication indicates that a UL spatial relation switch is to be performed by the UE 1010.

A switching delay 1004 based on the trigger received at the trigger point 1002. For example, the switching delay 1004 may be based, at least in part, on information included in the UL spatial relation switch signal 1016. The switching delay 1004 may be determined in accordance with the determining of the switching delay in 608 (FIG. 6), 710 (FIG. 7), or 808 (FIG. 8). The switching delay 1004 may determine a length of the switching delay 1004 based on information related to the trigger received at the trigger point 1002. The UE 1010 may avoid completing the UL spatial relation switch until the switching delay 1004 has expired in some embodiments. For example, the UE 1010 may complete the switch to a different beam for UL communication based on the UL spatial relation switch at the completion of the switching delay 1004. In some instances, the UE 1010 may continue to transmit communications using the beam utilized before the UL spatial relation switch during the switching delay 1004. The UE 1010 may switch to the different beam for transmission of the communications at the expiration of the switching delay 1004. In other embodiments, the UE 1010 may complete the switch as soon as possible. In particular, the UE may perform the UL spatial relation switch as soon as the UE has the information needed to perform the UL spatial relation switch.

The timing diagram 1000 includes a time period 1006 equal to the set time at which the UL spatial relation information switch signal 1016 is transmitted after the last transmission 1012 in the illustrated embodiment. The spatial relation information switch may be a starting point for the time period 1006. The time period 1006 may be utilized for determining the state of PL-RS information for a target PL-RS and/or determining whether a target UL spatial relation is known in some embodiments. For example, to determine that a value for the target PL-RS is known and/or a target UL spatial relation is known, the value and/or the target UL spatial relation may have been acquired during the time period 1006. The known condition may be determined by looking back up to 1280 ms from the UL spatial relation information switch command. For example, the known condition may be determined by looking back up to 1280 ms from the UL spatial relation information switch signal. If the value and/or the target UL spatial relation was acquired prior to the time period 1006, it may be determined that the value and/or the target UL spatial relation is unknown due to having been acquired prior to the time period 1006.

In other embodiments, the time period 1006 may be omitted and the determinations may not determine on the time the value and/or the target UL spatial relation were acquired. In other embodiments, the UE performing the determination of the state of the PL-RS information in 604 (FIG. 6), 706 (FIG. 7), or 804 (FIG. 8) and the determination of whether a target UL spatial relation is known in 606 (FIG. 6), 708 (FIG. 7), or 806 (FIG. 8) may determine whether network configuration related to the UE is the same at the time the value for the target PL-RS and/or the target UL spatial relation were acquired and the time that the UL spatial relation is triggered. If the UE determines that the network configuration is the same at the times, the UE may consider the value and/or the target UL spatial relation to determine whether they are known. If the UE determines that the network configuration is different at the times, the UE may determine that the value and/or the target UL spatial are unknown due to the difference in the network configuration.

Figure 11:
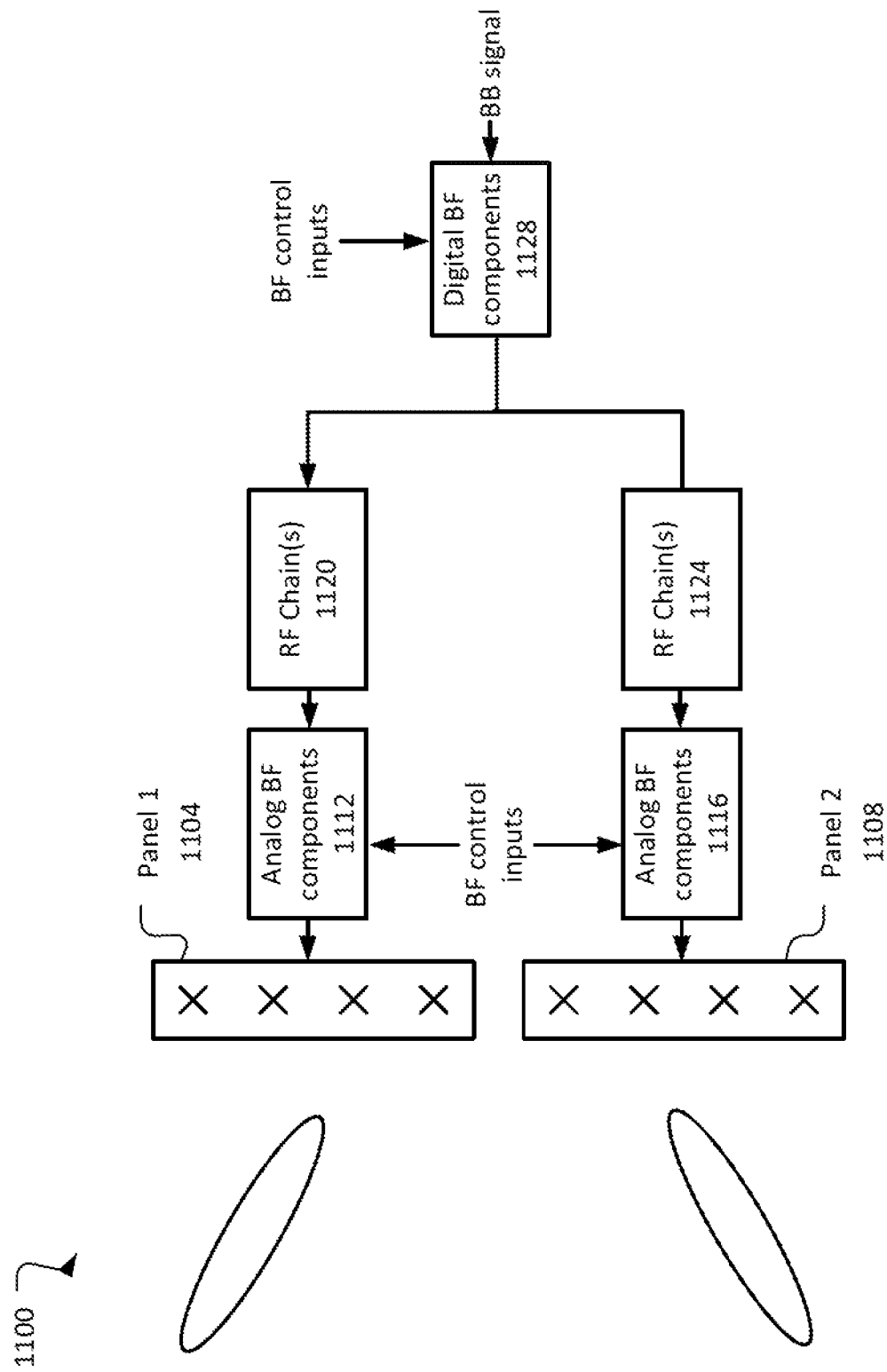
FIG. 11 illustrates example beamforming circuitry in accordance with some embodiments.

FIG. 11 illustrates example beamforming circuitry 1100 in accordance with some embodiments. The beamforming circuitry 1100 may include a first antenna panel, panel 11104, and a second antenna panel, panel 2 1108. Each antenna panel may include a number of antenna elements. Other embodiments may include other numbers of antenna panels.

Digital beamforming (BF) components 1128 may receive an input baseband (BB) signal from, for example, a baseband processor such as, for example, baseband processor 1204 of FIG. 12. The digital BF components 1128 may rely on complex weights to pre-code the BB signal and provide a beamformed BB signal to parallel radio frequency (RF) chains 1120/1124.

Each RF chain 1120/1124 may include a digital-to-analog converter to convert the BB signal into the analog domain; a mixer to mix the baseband signal to an RF signal; and a power amplifier to amplify the RF signal for transmission.

The RF signal may be provided to analog BF components 1112/1116, which may apply additionally beamforming by providing phase shifts in the analog domain. The RF signals may then be provided to antenna panels 1104/1108 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 12 illustrates an example UE 1200 in accordance with some embodiments. The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1200 may be a RedCap UE or NR-Light UE.

The UE 1200 may include processors 1204. RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

In some embodiments, the UE 1200 may include the beamforming circuitry 1100 (FIG. 11), where the beamforming circuitry 1100 may be utilized for communication with the UE 1200. In some embodiments, components of the UE 1200 and the beamforming circuitry may be shared. For example, the antennas 1226 of the UE may include the panel 1 1104 and the panel 2 1108 of the beamforming circuitry 1100.

The user interface circuitry 1216 includes various input/output (110) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200.

The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus save power. If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

FIG. 13 illustrates an example next generation nodeB (gNB) 1300 in accordance with some embodiments. The gNB 1300 may include processors 1304, RF interface circuitry 1308, core network (CN) interface circuitry 1312, memory/storage circuitry 1316, and antenna structure 1326.

The components of the gNB 1300 may be coupled with various other components over one or more interconnects 1228.

The processors 1304, RF interface circuitry 1308, memory/storage circuitry 1316 (including communication protocol stack 1210), antenna structure 1326, and interconnects 1228 may be similar to like-named elements shown and described with respect to FIG. 12.

The CN interface circuitry 1312 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to identify a trigger for an uplink (UL) spatial relation switch, determine a state of pathloss reference signal (PL-RS) information for a target PL-RS based at least in part on the trigger for the UL spatial relation switch, determine whether a target UL spatial relation is known based at least in part on the trigger for the UL spatial relation switch, and perform the UL spatial relation switch within a switching delay, the switching delay being based at least in part on the state of the PL-RS information and whether the target UL relation is known.

Example 2 may include the one or more computer-readable media of example 1, wherein to determine the state of the PL-RS information includes to determine whether the target PL-RS was previously measured or activated.

Example 3 may include the one or more computer-readable media of example 1 or example 2, wherein to determine the state of the PL-RS information includes to determine whether the target PL-RS is known.

Example 4 may include the one or more computer-readable media of example 1 or example 2, wherein the instructions, when executed by the one or more processors, further cause the UE to determine whether to perform a pathloss (PL) measurement for the target PL-RS based on the state of the PL-RS information.

Example 5 may include the one or more computer-readable media of example 4, wherein to determine whether to perform the PL measurement for the target PL-RS includes to determine to perform the PL measurement for the target PL-RS, and wherein the UE is to perform the PL measurement within the switching delay.

Example 6 may include the one or more computer-readable media of example 1, wherein to determine whether the target UL spatial relation is known includes to determine whether UL spatial relation information related to the UL spatial relation has been stored by the UE.

Example 7 may include the one or more computer-readable media of example 1, wherein the instructions, when executed by the one or more processors, further cause the UE to determine whether to perform reception (Rx) beam refinement for the target UL spatial relation based on whether the target UL spatial relation is known.

Example 8 may include the one or more computer-readable media of example 1, wherein the instructions, when executed by the one or more processors, further cause the UE to determine that target LL spatial relation information and the target PL-RS for the UL spatial relation switch are in different transmission configuration indicator (TCI) chains, and wherein switching delay includes a time for receive beam refinement for the target PL-RS based on a determination that the PL-RS is unknown.

Example 9 may include the one or more computer-readable media of example 1, wherein the instructions, when executed by the one or more processors, further cause the UE to determine that target UL spatial relation information and the target PL-RS for the UL spatial relation switch are in a same transmission configuration indicator (TCI) chain.

Example 10 may include a user equipment (UE) comprising memory to store uplink (UL) spatial relation and pathloss reference signal (PL-RS) information associated with the UE, and processing circuitry coupled with the memory, the processing circuitry to determine that target UL spatial relation information and a target PL-RS for a UL spatial relation switch are in different transmission configuration indicator (TCI) chains based at least in part on a trigger for a L1 spatial relation switch, determine a state of PL-RS information for the target PL-RS based at least in part on the trigger, and perform the UL spatial relation switch within a switching delay, the switching delay being based at least in part on the target UL spatial relation information and the target PL-RS being in different TCI chain and the state of the PL-RS information.

Example 11 may include the UE of example 10, wherein the processing circuitry is further to determine whether a target UL spatial relation is known based at least in part on the trigger for the UL spatial relation switch, wherein the switching delay is to be determined based further at least in part on whether the target UL spatial relation is known.

Example 12 may include the UE of example 11 or, wherein to determine the state of the target PL-RS information includes to determine whether a target PL-RS was previously measured or activated.

Example 13 may include the UE of example 11 or example 12, wherein the processing circuitry is further to determine to perform a pathloss (PL) measurement based on the state of the PL-RS information for the target PL-RS, and perform the PL measurement within the switching delay based on the determination to perform the PL measurement.

Example 14 may include the UE of example 13, wherein the switching delay is to include a time for the PL measurement of the target PL-RS.

Example 15 may include the UE of example 11 or example 12, wherein the processing circuitry is further to determine whether to perform reception (Rx) beam refinement for the target UL spatial relation based on whether the target UL spatial relation is known.

Example 16 may include the UE of example 15, wherein to determine whether to perform the Rx beam refinement includes to determine to perform the Rx beam refinement for the target UL spatial relation, and wherein the UE is to perform the Rx beam refinement within the switching delay.

Example 17 may include a method of operating a user equipment (UE) comprising identifying a trigger for an uplink (UL) spatial relation switch, determining a state of a target pathloss reference signal (PL-RS) information associated with the UE in response to identifying the trigger, determining whether a target UL spatial relation is known in response to identifying the trigger, and performing the UL spatial relation switch within a switching delay, the switching delay being based at least in part on the state of the PL-RS and whether the target UL spatial relation is known.

Example 18 may include the method of example 17, wherein determining the state of the target PL-RS information includes determining whether a target PL-RS corresponding to the target PL-RS information was previously measured or activated.

Example 19 may include the method of example 17, wherein determining the state of the target PL-RS information includes determining whether a target PL-RS corresponding to the PL-RS information is known.

Example 20 may include the method of example 18 or example 19, further comprising performing a pathloss (PL) measurement for the target PL-RS based on a determination that the target PL-RS was not previously measured or activated, or a determination that the target PL-RS is unknown.

Example 21 may include one or more computer-readable media having instructions that, when executed by one or more processors, cause a next generation nodeB (gNB) to identify an indication of a state of pathloss reference signal (PL-RS) information for a target PL-RS of an uplink (UL) spatial relation switch for a user equipment (UE) and whether a target UL spatial relation is known received from the UE, determine a switching delay for the UL spatial relation switch of the UE based on the indication, and schedule one or more transmission with the UE based on the switching delay.

Example 22 may include the one or more computer-readable media of example 21, wherein the indication indicates whether the target PL-RS was previously measured or activated by the UE, and wherein to determine the switching delay includes to determine the switching delay based on whether the target PL-RS was previously measured or activated by the UE.

Example 23 may include the one or more computer-readable media of example 21, wherein the indication indicates whether the target PL-RS is known by the UE, and wherein to determine the switching delay includes to determine the switching delay based on whether the target PL-RS is known by the UE.

Example 24 may include the one or more computer-readable media of any of examples 21-23, wherein the instructions, when executed by the one or more processors, further cause the gNB to determine whether target UL spatial relation information related to the UL spatial relation switch for the UE and the target PL-RS are in a same transmission configuration indicator (TCI) chain, and wherein the switching delay is determined based further on whether the target UL spatial relation information and the target PL-RS are in the same TCI chain.

Example 25 may include the one or more computer-readable media of any of examples 21-23, wherein to determine the switching delay includes to determine the switching delay to be equal to a time for medium access control (MAC) control element (CE) decoding or a radio resource control (RRC) processing delay plus an additional delay based on the indication.

Example 26 may include one or more computer-readable media having instructions that, when executed by one or more processors, cause a user equipment (UE) to identify a trigger for an uplink (UL) spatial relation switch, determine a state of pathloss reference signal (PL-RS) information for a target PL-RS, determine whether a target UL spatial relation is known, and determine a switching delay for the UL spatial relation switch based on the state of the PL-RS information and whether the target UL spatial relation is known.

Example 27 may include the one or more computer-readable media of example 26, wherein to determine the state of the PL-RS information includes to determine whether the target PL-RS was previously measured or activated.

Example 28 may include the one or more computer-readable media of example 26, wherein to determine the state of the PL-RS information includes to determine whether a value for the target PL-RS is known.

Example 29 may include the one or more computer-readable media of example 26, wherein to determine the switching delay includes to determine that the switching delay is equal to a set delay plus an additional delay, wherein the additional delay depends on the state of the PL-RS information and whether the target UL spatial relation is known.

Example 30 may include the one or more computer-readable media of example 29, wherein the additional delay includes a time for receive beam refinement for the target UL spatial relation in response to a determination that the target UL spatial relation is unknown.

Example 31 may include the one or more computer-readable media of example 29, wherein the additional delay includes a time for a target PL-RS measurement in response to a determination that the target PL-RS was not previously measured or activated.

Example 32 may include the one or more computer-readable media of example 29, wherein target UL spatial relation information and the target PL-RS for the UL spatial relation switch are within different transmission configuration indicator (TCI) chains, and wherein the additional delay includes a time for receive beam refinement for the target PL-RS in response to a determination that a value for the target PL-RS is unknown.

Example 33 may include the one or more computer-readable media of example 29, wherein the trigger is provided via radio resource control (RRC), and wherein the set delay includes an RRC message processing delay.

Example 34 may include the one or more computer-readable media of example 29, wherein the trigger is provided via medium access control (MAC)-control element (CE), and wherein the set delay includes a MAC CE decoding delay.

Example 35 may include a user equipment (UE) comprising memory to store uplink (UL) spatial relation and pathloss reference signal (PL-RS) information associated with the UE, and processing circuitry coupled with the memory, the processing circuitry to determine whether target UL spatial relation information and a target PL-RS for a UL spatial relation switch are included within a same transmission configuration indicator (TCI) chain based on a trigger for the UL spatial relation switch, and determine a switching delay for the UL spatial relation switch based on whether the target UL spatial relation information and the target PL-RS are included within the same TCI chain.

Example 36 may include the UE of example 35, wherein the processing circuitry is further to determine a state of target PL-RS information based on the trigger for the UL spatial relation switch, and determine whether a target UL spatial relation is known based on the trigger for the UL spatial relation switch, wherein the switching delay is determined based further on the state of the target PL-RS information and whether the target UL spatial relation is known.

Example 37 may include the UE of example 36, wherein to determine the state of the target PL-RS information includes to determine whether a target PL-RS was previously measured or activated.

Example 38 may include the UE of example 36, wherein to determine the state of the target PL-RS information includes to determine whether a value for a target PL-RS is known.

Example 39 may include the UE of example 36, wherein to determine the switching delay includes to determine that the switching delay is equal to a radio resource control (RRC) message processing delay or a medium access control (MAC) control element (CE) decoding delay, plus an additional time, wherein the additional time includes a time for a target PL-RS measurement in response to a determination that a target PL-RS was not previously measured or activated, a time for reception beam refinement of the target UL spatial relation in response to a determination that the target UL spatial relation is unknown, or a time for reception beam refinement for the target PL-RS in response a determination that a value for the target PL-RS is unknown.

Example 40 may include the UE of example 36, wherein to determine the switching delay includes to determine that the switching delay is equal to a radio resource control (RRC) message processing delay or a medium access control (MAC) control element (CE) decoding delay, plus a sum of a time for reception beam refinement for the target UL spatial relation and a time for a target PL-RS measurement in response to a determination that the target UL spatial relation is unknown and a target PL-RS was not previously measured or activated, or a greater of the time for reception beam refinement for the target UL spatial relation and the time for target PL-RS measurement in response to the determination that the target UL spatial relation is unknown and the target PL-RS was not previously measured or activated.

Example 41 may include the UE of example 36, wherein to determine the switching delay includes to determine that the switching delay is equal to a radio resource control (RRC) message processing delay or a medium access control (MAC) control element (CE) decoding delay, plus a sum of a time for reception beam refinement for the target UL spatial relation and a time for a target PL-RS measurement in response to a determination that the target UL spatial relation is unknown and a target PL-RS was not previously measured or activated, or a greater of the time for reception beam refinement for the target UL spatial relation and the time for the target PL-RS measurement in response to the determination that the target UL spatial relation is unknown and the target PL-RS was not previously measured or activated.

Example 42 may include the UE of example 36, wherein to determine the switching delay includes to determine that the switching delay is equal to a radio resource control (RRC) message processing delay or a medium access control (MAC) control element (CE) decoding delay, plus a sum of a time for reception beam refinement for a target PL-RS and a time for a target PL-RS measurement in response to a determination that a value for the target PL-RS is unknown and the target PL-RS was not previously measured or activated, a sum of the time for reception beam refinement for the target PL-RS and a time for reception beam refinement for the target UL spatial relation in response to a determination that the value for the target PL-RS is unknown and the target UL spatial relation is unknown, or a sum of the time for reception beam refinement for the target PL-RS, the time for the target PL-RS measurement, and the time for reception beam refinement for the target UL spatial relation in response to a determination that the value for the target PL-RS is unknown, the target PL-RS was not previously measured or activated, and the target UL spatial relation is unknown, or a greater of the time for reception beam refinement for the target PL-RS and the time for the target PL-RS measurement in response to the determination that the value for the target PL-RS is unknown and the target PL-RS was not previously measured or activated, a greater of the time for reception beam refinement for the target PL-RS and the time for reception beam refinement for the target UL spatial relation in response to the determination that the value for the target PL-RS is unknown and the target UL spatial relation is unknown, or a greater of the time for reception beam refinement for the target PL-RS, the time for the target PL-RS measurement, and the time for reception beam refinement for the target UL spatial relation in response to the determination that the value for the target PL-RS is unknown, the target PL-RS was not previously measured or activated, and the target UL spatial relation is unknown.

Example 43 may include a method of operating a user equipment (UE) comprising identifying a trigger for an uplink (UL) spatial relation switch, determining a state of a target pathloss reference signal (PL-RS) information associated with the UE in response to identifying the trigger, determining whether a target UL spatial relation is known in response to identifying the trigger, and determining a switching delay for the UL spatial relation switch based on the state of the target PL-RS information and whether the target UL spatial relation is known.

Example 44 may include the method of example 43, wherein determining the switching delay includes determining that the switching delay is equal to a set delay plus an additional delay, wherein the additional delay depends on the state of the target PL-RS information and whether the target UL spatial relation is known.

Example 45 may include the method of example 44, wherein the additional delay includes a time for reception beam refinement for the target UL spatial relation in response to a determination that the target UL spatial relation is unknown.

Example 46 may include the method of example 44, wherein the additional delay includes a time for a target PL-RS measurement in response to a determination that a target PL-RS was not previously measured or activated.

Example 47 may include the method of example 44, wherein the additional delay includes a time for reception beam refinement for a target PL-RS in response to a determination that a value for the target PL-RS is unknown.

Example 48 may include a method comprising performance of the operations of any of examples 1-47.

Example 49 may include an apparatus comprising means to perform one or more elements of any of examples 1-47.

Example 50 may include a signal as described in or related to any of examples 1-47, or portions or parts thereof.

Example 51 may include a datagram, information element, packet, frame, segment, PDU, or message as described in or related to any of examples 1-47, or portions or parts thereof, or otherwise described in the present disclosure.

Example 52 may include a signal encoded with data as described in or related to any of examples 1-47, or portions or parts thereof, or otherwise described in the present disclosure.

Example 53 may include a signal encoded with a datagram, IE, packet, frame, segment, PDU, or message as described in or related to any of examples 1-47, or portions or parts thereof, or otherwise described in the present disclosure.

Example 54 may include an electromagnetic signal carrying computer-readable instructions, wherein execution of the computer-readable instructions by one or more processors is to cause the one or more processors to perform the method, techniques, or process as described in or related to any of examples 1-47, or portions thereof.

Example 55 may include a signal in a wireless network as shown and described herein.

Example 56 may include a method of communicating in a wireless network as shown and described herein.

Example 57 may include a system for providing wireless communication as shown and described herein.

Example 58 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a device to:
   identify a trigger for an uplink (UL) spatial relation switch;
   determine a state of pathloss reference signal (PL-RS) information for a target PL-RS for the UL spatial relation switch; and
   perform the UL spatial relation switch within a switching delay, the switching delay being based at least in part on the state of the PL-RS information.

2. The one or more non-transitory computer-readable media of claim 1, wherein to determine the state of the PL-RS information includes to determine whether the target PL-RS was previously measured or activated.

3. The one or more non-transitory computer-readable media of claim 1, wherein to determine the state of the PL-RS information includes to determine whether the target PL-RS is known.

4. The one or more non-transitory computer-readable media of claim 1, wherein the instructions, when executed by the one or more processors, further cause the device to determine whether to perform a pathloss (PL) measurement for the target PL-RS based at least in part on the state of the PL-RS information.

5. The one or more non-transitory computer-readable media of claim 4, wherein to determine whether to perform the PL measurement for the target PL-RS includes to determine to perform the PL measurement for the target PL-RS, and wherein the device is to perform the PL measurement within the switching delay.

6. The one or more non-transitory computer-readable media of claim 1, wherein the instructions, when executed by the one or more processors, further cause the device to determine that target UL spatial relation information and the target PL-RS for the UL spatial relation switch are in different transmission configuration indicator (TCI) chains, and wherein the switching delay includes a time for receive beam refinement for the target PL-RS based at least in part on a determination that the target PL-RS is unknown.

7. The one or more non-transitory computer-readable media of claim 1, wherein the instructions, when executed by the one or more processors, further cause the device to determine that target UL spatial relation information and the target PL-RS for the UL spatial relation switch are in a same transmission configuration indicator (TCI) chain.

8. The one or more non-transitory computer-readable media of claim 1, wherein the trigger for the UL spatial relation switch comprises a medium access control-control element (MAC-CE).

9. The one or more non-transitory computer-readable media of claim 1, wherein the instructions, when executed by the one or more processors, cause the device to:
determine whether a target UL spatial relation is known for the UL spatial relation switch, wherein the switching delay is based at least in part on whether the target UL spatial relation is known.

10. The one or more non-transitory computer-readable media of claim 9, wherein to determine whether the target UL spatial relation is known includes to determine whether UL spatial relation information related to the target UL spatial relation has been stored by the device.

11. The one or more non-transitory computer-readable media of claim 9, wherein the instructions, when executed by the one or more processors, further cause the device to determine whether to perform reception (Rx) beam refinement for the target UL spatial relation based at least in part on whether the target UL spatial relation is known.

12. A method of operating a device comprising:
determining a state of pathloss reference signal (PL-RS) information for a target PL-RS for an uplink spatial relation switch;
determining a switching delay for the UL spatial relation switch based at least in part on the state of the PL-RS information; and
performing the UL spatial relation switch within the determined switching delay.

13. The method of claim 12, wherein determining the state of the PL-RS information includes determining whether the target PL-RS corresponding to the PL-RS information was previously measured or activated.

14. The method of claim 12, wherein determining the state of the PL-RS information includes determining whether the target PL-RS is known.

15. The method of claim 13, further comprising performing a pathloss (PL) measurement for the target PL-RS based at least in part on a determination that the target PL-RS was not previously measured or activated, or a determination that the target PL-RS is unknown.

16. The method of claim 12, further comprising identifying a medium access control-control element (MAC-CE) to trigger the UL spatial relation switch.

17. The method of claim 12, further comprising determining whether a target UL spatial relation is known for the UL spatial relation switch, wherein the switching delay is based at least in part on whether the target UL relation is known.

18. A device, comprising:
interface circuitry to facilitate one or more communications of the device;
one or more processors coupled to the interface circuitry, the one or more processors to:
identify a trigger for an uplink (UL) spatial relation switch;
determine whether a target pathloss reference signal (PL-RS) is known based at least in part on PL-RS information;
determine a switching delay for the UL spatial relation switch based at least in part on whether the target PL-RS is known; and
perform the UL spatial relation switch within the determined switching delay.

19. The device of claim 18, wherein the trigger for the UL spatial relation switch comprises a medium access control-control element (MAC-CE).

20. The device of claim 18, wherein the one or more processors are to:
determine whether a target UL spatial relation is known for the UL spatial relation switch, wherein the switching delay is based at least in part on whether the target UL spatial relation is known.

* * * * *